US008506377B2

(12) United States Patent
Heatherly

(10) Patent No.: US 8,506,377 B2
(45) Date of Patent: Aug. 13, 2013

(54) SYSTEMS AND METHODS TO PROVIDE AUGMENTED REALITY FOR A BOARD GAME

(75) Inventor: Christopher W. Heatherly, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 145 days.

(21) Appl. No.: 12/894,835

(22) Filed: Sep. 30, 2010

(65) Prior Publication Data

US 2012/0083325 A1  Apr. 5, 2012

(51) Int. Cl.
*A63F 9/24* (2006.01)
*A63F 13/00* (2006.01)
*G06F 17/00* (2006.01)
*G06F 19/00* (2006.01)
*G09G 5/14* (2006.01)

(52) U.S. Cl.
USPC ............................................. 463/16; 345/629

(58) Field of Classification Search
USPC ............................................. 463/16; 345/629
See application file for complete search history.

(56) References Cited

U.S. PATENT DOCUMENTS

| 7,289,130 B1 | 10/2007 | Satoh et al. |
| 2005/0255078 A1 | 11/2005 | Sakamoto et al. |
| 2005/0285878 A1 | 12/2005 | Singh et al. |

FOREIGN PATENT DOCUMENTS

WO   2005/107274 A1   11/2005

OTHER PUBLICATIONS

Marco Buccio, "Augmented Reality Chess", Apr. 1, 2008, Science & Technology, retrieved on Sep. 30, 2010, download from the Internet: http://www.youtube.com/watch?v=W94CEyVGmn0, 2pgs.

*Primary Examiner* — William M. Brewster
(74) *Attorney, Agent, or Firm* — Buckley, Maschoff & Talwalkar LLC

(57) ABSTRACT

According to some embodiments, an image may be received from a camera of a portable computing device associated with a player (e.g., a wireless telephone or game system). At least a portion of a board game may be recognized within the image, and an augmented version of the image may be displayed on the portable computing device. According to some embodiments, a board game score may be automatically determined for the player based on (i) an input received from the player via the portable computing device and (ii) the image associated with the board game. According to other embodiments, the image associated with the board game includes a portion of a visual message not readable by a human and the augmented version of the image includes supplemental information readable by a human when combined with the portion of the visual message.

24 Claims, 9 Drawing Sheets

400

| GAME ID | FIRST IMAGE | SECOND IMAGE | |
|---|---|---|---|
| G_01 | BOARD_1.JPG | BOARD_2.JPG | |
| G_02 | CARD_1.BMP | CARD_2.BMP | |
| G_03 | TOKEN_1.JPG | TOKEN_2.JPG | |
| G_04 | ACTIION_FIGURE_1.JPG | ACTIION_FIGURE_2.JPG | |

*FIG. 4*

| PLAYER ID | SCORE | LEVEL |
|---|---|---|
| P_01 | 1,500 | 3 |
| P_02 | 1,000 | 2 |
| P_03 | 0 | 1 |
| P_04 | 1,250 | 3 |

*FIG. 5*

SYSTEMS AND METHODS TO PROVIDE AUGMENTED REALITY FOR A BOARD GAME

FIELD

The present invention relates to systems and methods wherein augmented reality may be incorporated into a board game. Some embodiments relate to systems and methods to efficiently provide augmented reality in connection with score keeping and/or displaying messages for a board game.

BACKGROUND

When playing a board game, a player may move a game token to various positions on a game board. For example, players may take turns moving tokens a number of positions on the game board after spinning a spinner or rolling a pair of dice. Moreover, different positions may be associated with different game actions (e.g., one position may result in a player losing a turn while another position results in a player getting an extra turn). In some cases, a stack of cards may be incorporated into the board game. For example, a player might move his or her token onto a game board position and remove a card from the stack (and different cards may be associated with different game actions). Note that some board games require players to manually keep score (e.g., by tallying points or accumulating pretend money).

Note that sitting around a game board may provide an enjoyable social experience for players. That is, the players may spend time looking at, and interacting with, each other (unlike a typical experience when playing a video game by staring at a computer screen). While board games are very popular with players, any features that could be incorporated into them that would increase the amusement value (and lessen the burdens) associated with board games would be advantageous.

BRIEF DESCRIPTION OF THE DRAWINGS

FIG. 4 is a tabular representation of a portion of a board game image data table according to some embodiments of the present invention.

FIG. 5 is a tabular representation of a portion of a board game scoring data table in accordance with some embodiments of the present invention.

DETAILED DESCRIPTION

Applicants have recognized that there is a need for methods, systems, apparatus, means and computer program products to efficiently and accurately increase the amusement value (and lessen the burdens) associated with board games.

As used herein, the phrase "board game" may refer to any games where players physically manipulate items in relation to each other during game play. For example, a board game might include a board that can be unfolded and used to position game tokens. As another example, a board game might include a card game where players place various cards on a pre-printed card field or directly on a table. Still other examples might include a chess board or similar environments (e.g., a Chinese checkers board).

Figure 1:
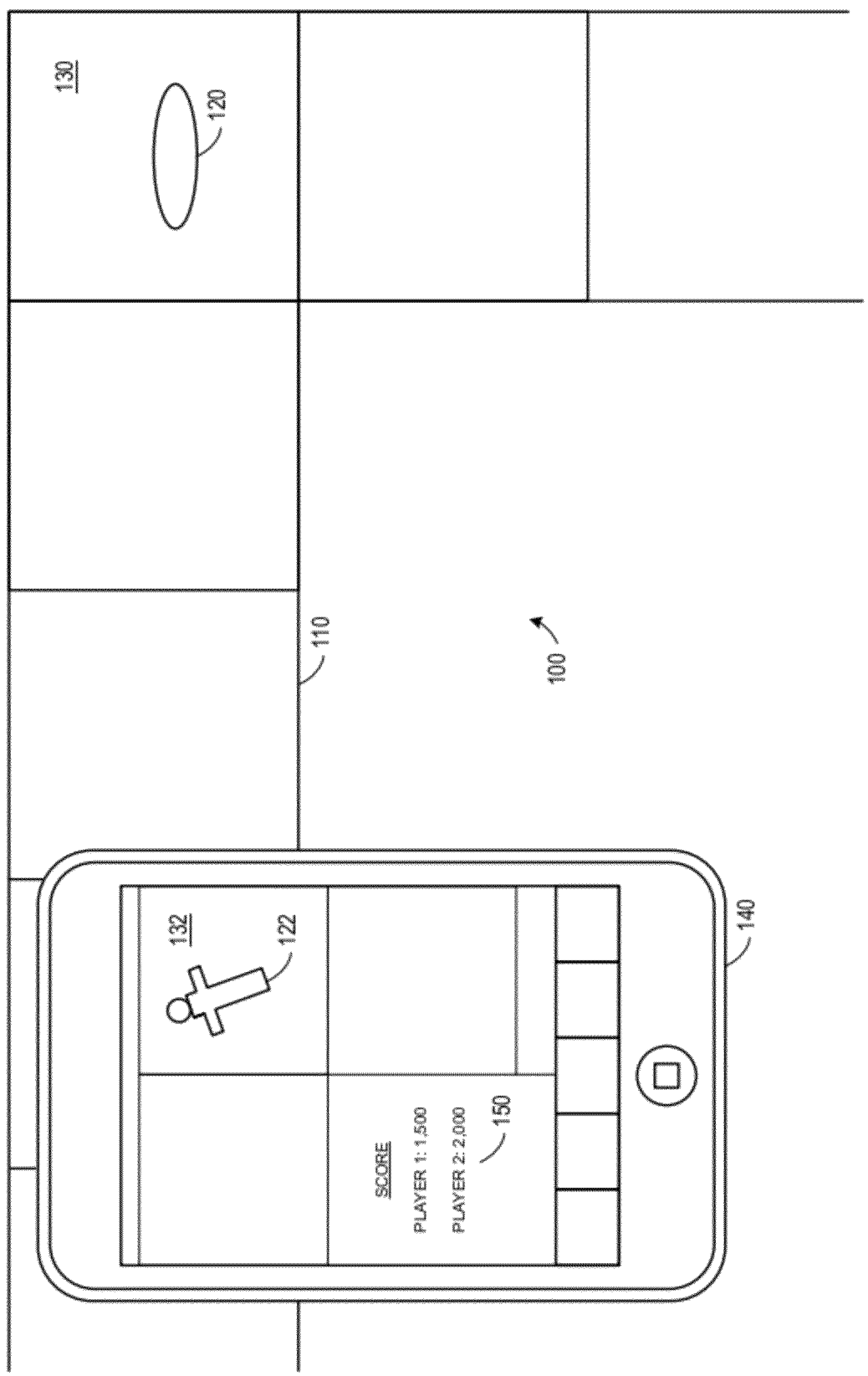
FIG. 1 is an illustration of a game system according to some embodiments of the present invention.

FIG. 1 illustrates a game system 100 according to some embodiments of the present invention. In this example, a game board 110 includes a number of squares on which a player may place a game token 120. For example, the game token 120 illustrated in FIG. 1 is place within a corner square 130. Moreover, a portable computing device 140 associated with a player includes a camera that can generate image information associated with the board game and a screen that can display information to a player.

When the camera of the portable computer device 140 is pointed at the game board 110, an image of the game board may be displayed on the screen of the portable computer device 140. The camera may be any device adapted to provide image information (e.g., a digital still camera or a digital video camera) and may be associated with, for example, a wireless telephone, a music player, a laptop computer, and/or a game system. When the game board is within the field of view of the camera, the displayed image might include a representation of the corner square 132.

According to some embodiments, the portable computer device 140 may augment the image displayed on the screen. As used herein, an augmented image might, for example, combine computer-generated information with read-world data. In general, any type of augmented reality may be provided (e.g., graphic objects blended into real video in substantially real time). For example, an animated character 122 might be displayed in the representation of the corner square 132 (e.g., because the portable computer device 140 recognized that the game token 120 was positioned in the actual corner square 130 of the game board 110). Note that image information might also be removed from the screen (e.g., the representation of the game token 120 could, according to some embodiments, be removed). Moreover, according to some embodiments, scoring information 150 associated with one or more players might be displayed on the screen of the portable computer device 140. For example, an amount of money or a number of pointes for each player might be tracked by the portable computer device 140 and displayed on the screen (e.g., to remove this burden from th players).

The location, size, color, etc. of the scoring information 150 may, according to some embodiments, be adjusted based on the image of the game board 110 and/or the location of the game token 120 (e.g., a particular score might be displayed proximate to a particular game token 120 or animated character 122). Note that different players (with different portable devices) may see different views and/or versions of the game board 110.

Figure 2:
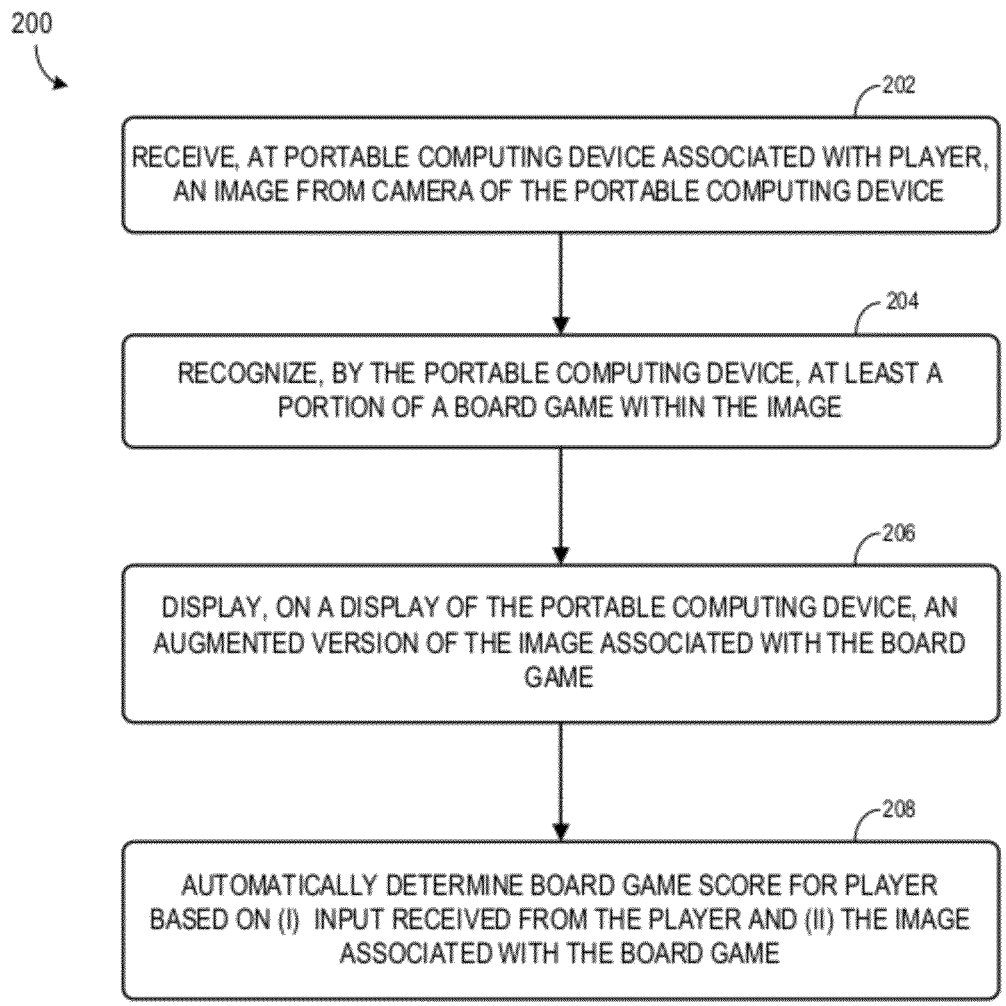
FIG. 2 is a flow chart of a method in accordance with some embodiments of the present invention.

FIG. 2 illustrates a method 200 that might be performed, for example, by some or all of the elements described herein. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 202, an image may be received from a camera of a portable computing device associated with a player. The portable computing device might be associated with, for example, a hand held computer, a wireless telephone, a music player, a game system, and/or a laptop computer with a web camera.

At 204, at least a portion of a game board is recognized within the received image (e.g., the game board itself, a game token, and/or a game card might be recognized by the portable computing device). The game board might be recognized, for example, based on one or more images stored within the portable computing device. Note that the board game might be associated with a game of skill and/or chance, a trivia game, game tokens, and/or a card game.

At 206, an augmented version of the image associated with the board game may be displayed on a display of the portable computing device. For example, the received image might comprise a video stream and the displayed augmented version of the image might comprise an augmented video stream. The augmented version of the image might include, for example, an animated character associated with the board game, an effect associated with the board game (e.g., it might appear to be raining on a particular portion of the game board), and/or removing image information associated with the board game (e.g., replacing a game token with an animated character). According to some embodiments, the augmented version of the image includes a three dimensional object superimposed on the board game (e.g., a three dimensional building or forest might be displayed on a game board).

At 208, the portable computing device may automatically determine a board game score for the player based on (i) an input received from the player via the portable computing device and (ii) the image associated with the board game. For example, the input received from the player via the portable computing device could associated with an interactive game played on the portable computing device (e.g., a mini-game or trivia game). In some embodiments, the portable computing device "watches" as the board game is played to determine the appropriate scoring information.

According to some embodiments, the portable computing device might communicate with other portable computing devices, associated with other players, in connection with board game. For example, the portable computing device might receive game or scoring information from other devices. Moreover, the portable computing device might recognize at least one game token associated with the board game, and the augmented image may be provided based on the game token (e.g., different tokens might be associated with different animated characters).

Figure 3:
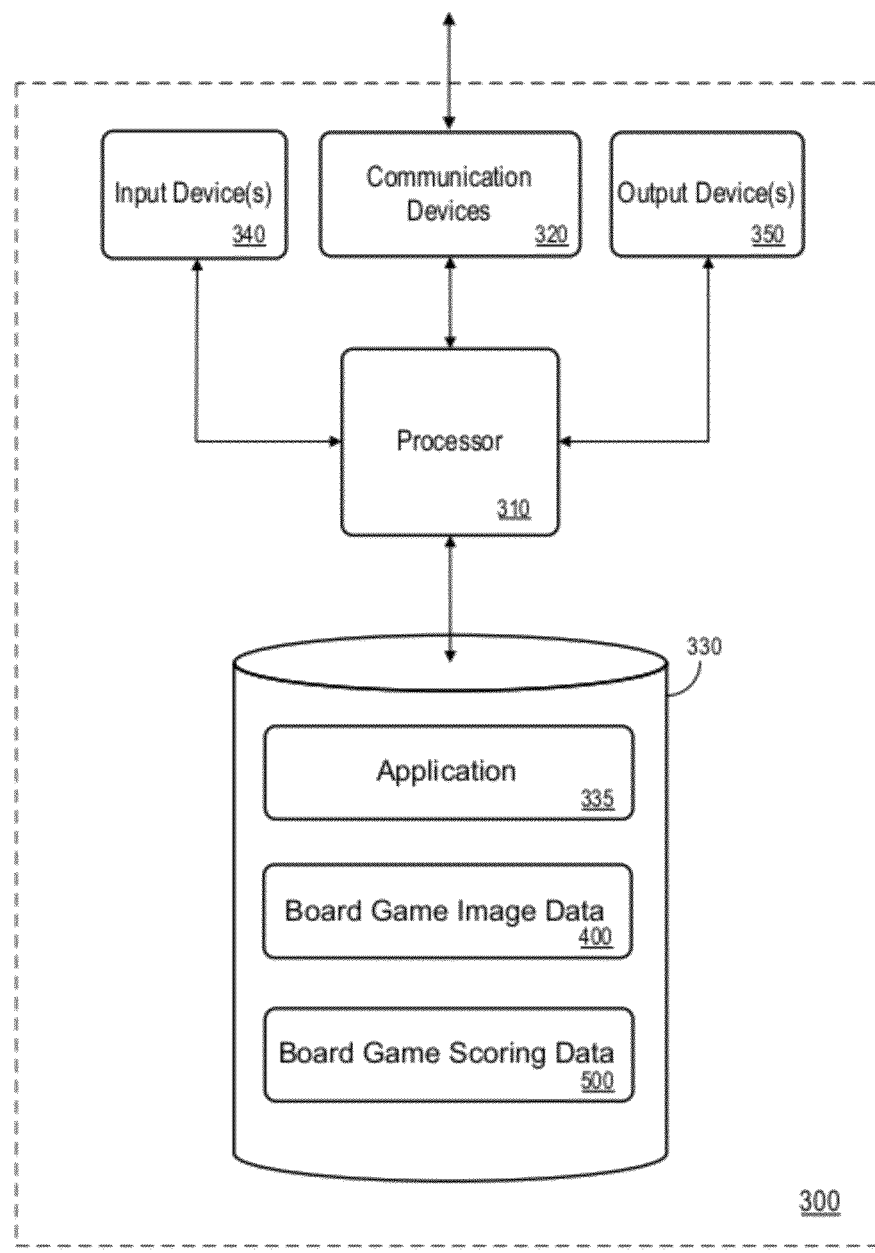
FIG. 3 is a block diagram of a platform in accordance with some embodiments of the present invention.

According to some embodiments, the receiving, recognizing, displaying, and/or determining of 202, 204, 206, and/or 208, respectively, may be performed locally by a player's portable computing device. For example, FIG. 3 is a block diagram of an augmented reality platform 300 that might be associated with, for example, the system 100 of FIG. 1 in accordance with some embodiments of the present invention. The augmented reality platform 300 comprises a processor 310, such as one or more INTEL® Pentium® processors, coupled to communication devices 320 configured to communicate with remote devices (not shown in FIG. 3). The communication devices 320 may be used, for example, to receive game board and/or game token images from a remote server and/or to perform an authentication function associated with a player or game.

The processor 310 is also in communication with an input device 340. The input device 340 may comprise, for example, a camera, a keyboard, a mouse, a game controller, and/or a computer media reader. Such an input device 340 may be used, for example, to receive image information and/or game information provided by a player. The processor 310 is also in communication with an output device 350. The output device 350 may comprise, for example, a display screen or image generating eyeglasses. Such an output device 350 may be used, for example, to provide game information, including an augmented video stream of a game board, to a player.

The processor 310 is also in communication with a storage device 330. The storage device 330 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

The storage device 330 stores an application 335 for controlling the processor 310. The processor 310 performs instructions of the application 335, and thereby operates in accordance any embodiments of the present invention described herein. For example, the processor 310 may recognize that a player has placed a player object (e.g., a game board or game token) within a field of view of a camera. The processor 310 may also augment image information and/or automatically determine scoring information associated with the game or the player.

As used herein, information may be "received" by or "transmitted" to, for example: (i) the augmented reality platform 300 from other devices; or (ii) a software application or module within augmented reality platform 300 from another software application, module, or any other source.

As shown in FIG. 3, the storage device 330 also stores board game image data 400 and board game scoring data 500. Example of such databases 400, 500 that might be used in connection with the augmented reality platform 300 will now be described in detail with respect to FIGS. 4 and 5. The illustrations and accompanying descriptions of the databases presented herein are exemplary, and any number of other database arrangements could be employed besides those suggested by the figures.

FIG. 4 is a tabular representation of a portion of a board game image data table 400 in accordance with some embodiments of the present invention. The table 400 includes entries associated with different board games. The table 400 also defines fields for each of the entries. The fields might specify a game identifier along with multiple images of the game boards to facilitate recognition of the game boards. The information in the database 400 may be created and/or periodically updated based on information received from, for example, an installation disc included with a board game and/or a remote server. Note that image information associated with a single game board or multiple game boards (as illustrated in FIG. 4) and/or multiple manufacturers might be stored in the table. According to some embodiments, the table 400 may include other information to help facilitate recognition of a game object (e.g., computer models or distances between various game object parts).

FIG. 5 is a tabular representation of a portion of a board game scoring data table 500 in accordance with some embodiments of the present invention. The table 500 includes entries associated with different players. The table 500 also defines fields for each of the entries. The fields might specify a player identifier, a game identifier (e.g., identical to or based on the game identifier of FIG. 4), and/or a game level. The information in the database 500 may be created and/or periodically updated based on information received from, for example, a player, a camera, and/or other portable computing devices. Note that scoring information associated with a single player or multiple players (as illustrated in FIG. 5) and/or multiple games might be stored in the table. Note that when a game token is recognized at a particular location on a game board using the information in the board game image data table 400, the appropriate score might be updated or new game or level could be unlocked for the player. Note that each object identifier in the board game scoring data table 500 may also be associated with a list of player identifiers (IDs) representing players who are on the same team. Also note that the players could be remote from one another.

Figure 6:
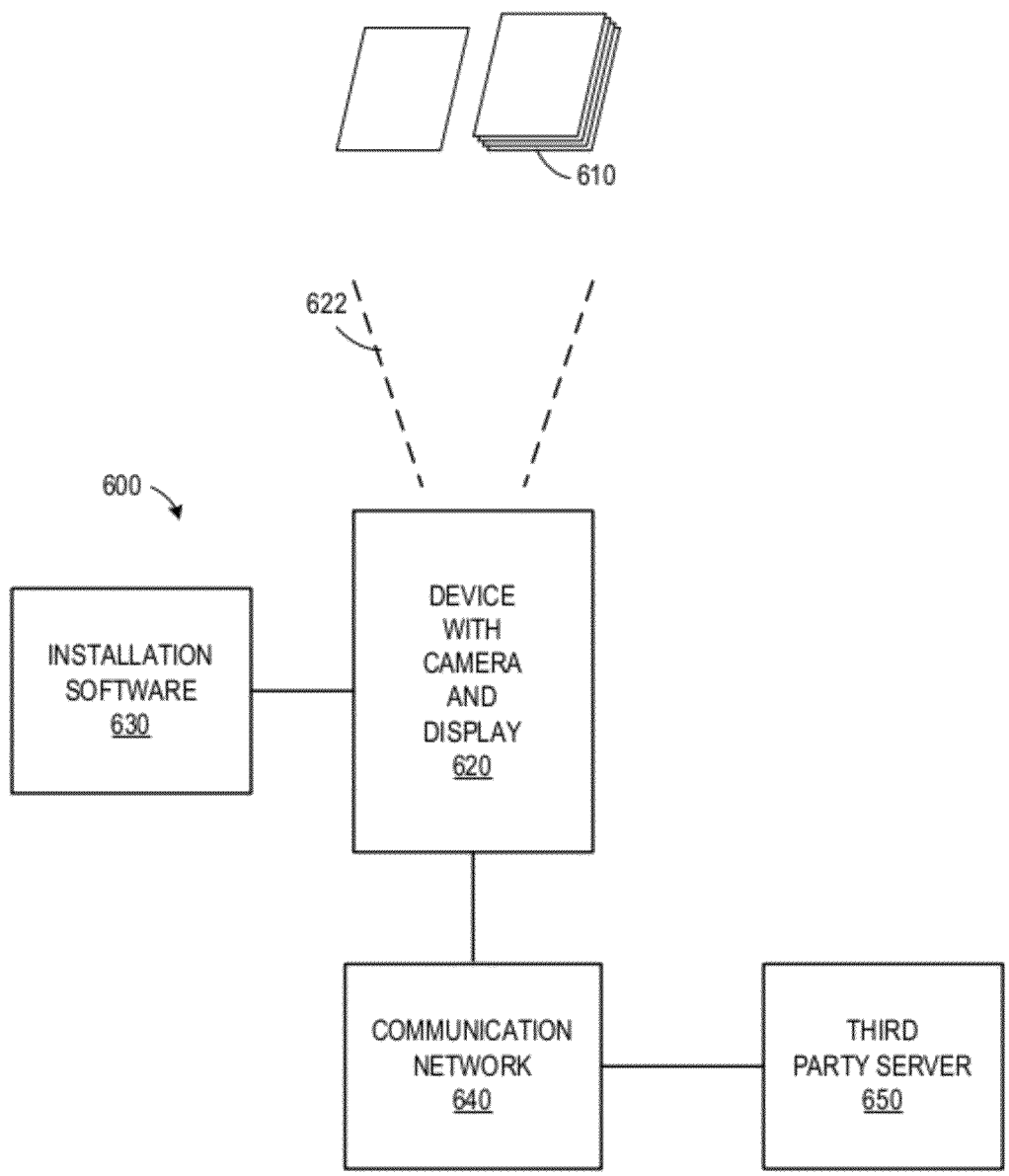
FIG. 6 is an illustration of a system according to some embodiments of the present invention.

As noted, the recognition of a board game and/or the determination of scoring information may be performed locally by a player's portable computing device. According to other embodiments, at least one of these functions may be performed remote from the player. For example, FIG. 6 is an illustration of a system 600 in accordance with some embodiments of the present invention. In this case, the player places one or more game cards 610 within a field of view 622 of a device with a camera and display 620. The device with a camera and display 620 may then recognize various game cards 610 by accessing information received from installation software 630 (e.g., a CD packaged along with the card game) and/or exchanging information with a remote third party server 650 via a communication network 640 (e.g., the Internet and/or a wireless telephone network). For example, the device with a camera and display 620 might transmit might transmit a message to the remote third party server 650 including a game board identifier (and, in some cases a player or player device identifier). The third party server 650 may then transmit information to the device with a camera and display 620 to arrange for an image to be augmented as appropriate (e.g., by transmitting data associated with an animated character) and/or for the appropriate score to be calculated for the player.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 7:
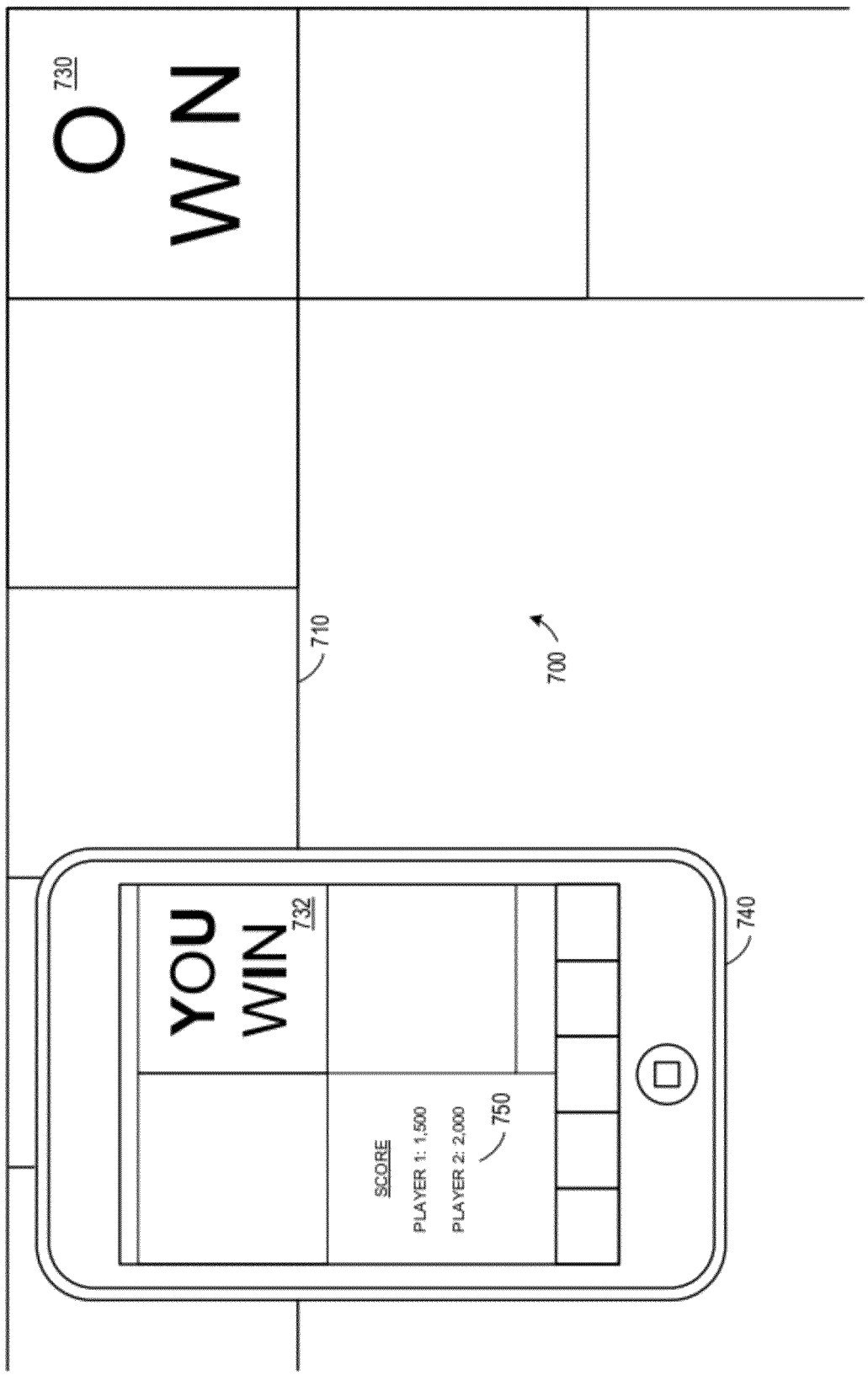
FIG. 7 is an illustration of a game system in accordance with another embodiment of the present invention.

Although handheld devices have been described in some of the examples presented herein, note that other devices may be incorporated in addition to (or instead of) handheld computers in accordance with the present invention. Moreover, although examples have described augmenting images with respect to scoring information, not that any other type of augmentation may also be performed instead of (or in addition to) scoring information. For example, FIG. 7 is an illustration of a game system 700 including a game board 710 with a number of squares (e.g., on which a player may place a game token). Moreover, a corner square 730 includes a portion of a visual message not readable by a human ("O" and "W N"). That is, the portion shown on the game board does not include enough information to be read by a player.

A portable computing device 740 associated with a player includes a camera that can generate image information associated with the board game and a screen that can display information to a player. According to this embodiment, the portable computing device 740 displays an augmented version of the image associated with the board game, wherein the augmented version of the image includes supplemental information readable by a human when combined with the portion of the visual message. In this example, the letters "Y," "U," and "I" have been superimposed with the portion printed on the game board and the player can now read the message "YOU WIN." As before, scoring information 750 may also be included on the display.

Figure 8:
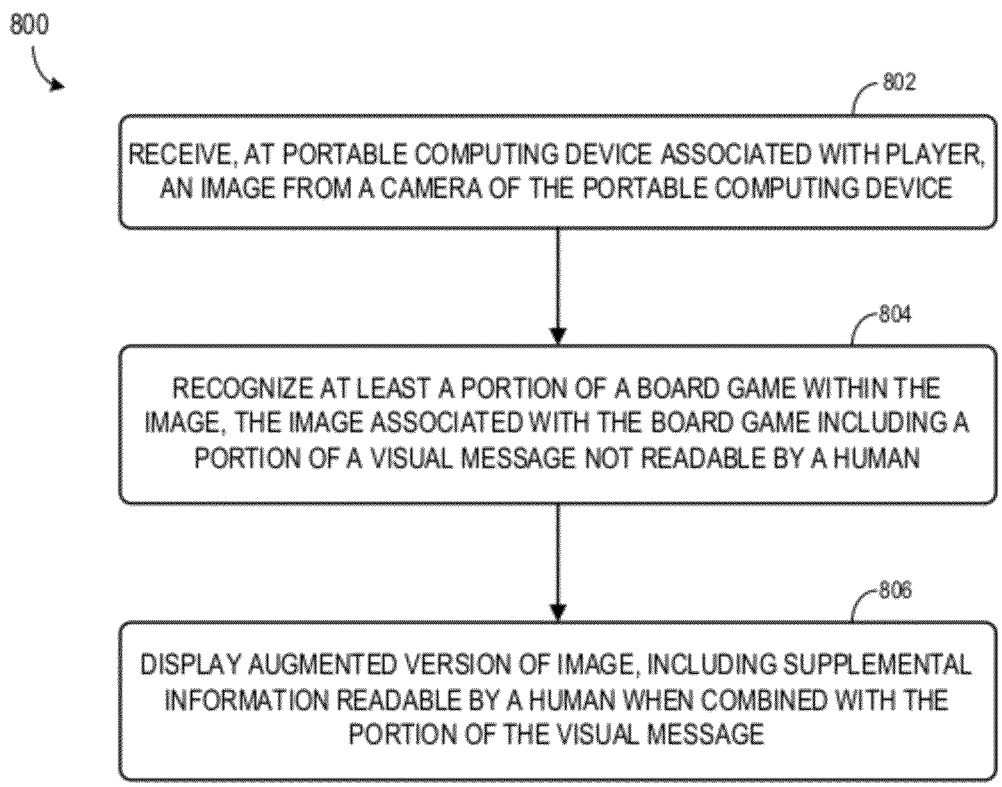
FIG. 8 is a flow chart of a method in accordance with some embodiments of the present invention.

FIG. 8 illustrates a method 800 that might be performed, for example, by some or all of the elements of FIG. 7. At 802, a portable computing device associated with a play receives image information from a camera. At 804, the portable computing device recognizes at least a portion of a board game within the image, the image associated with the board game including a portion of a visual message not readable by a human. At 806, an augmented version of the image associated with the board game is displayed, wherein the augmented version of the image includes supplemental information readable by a human when combined with the portion of the visual message. The supplemental information might include, for example, supplemental letters, supplemental words, supplemental numbers, supplemental symbols, and/or supplemental pixels.

Figure 9:
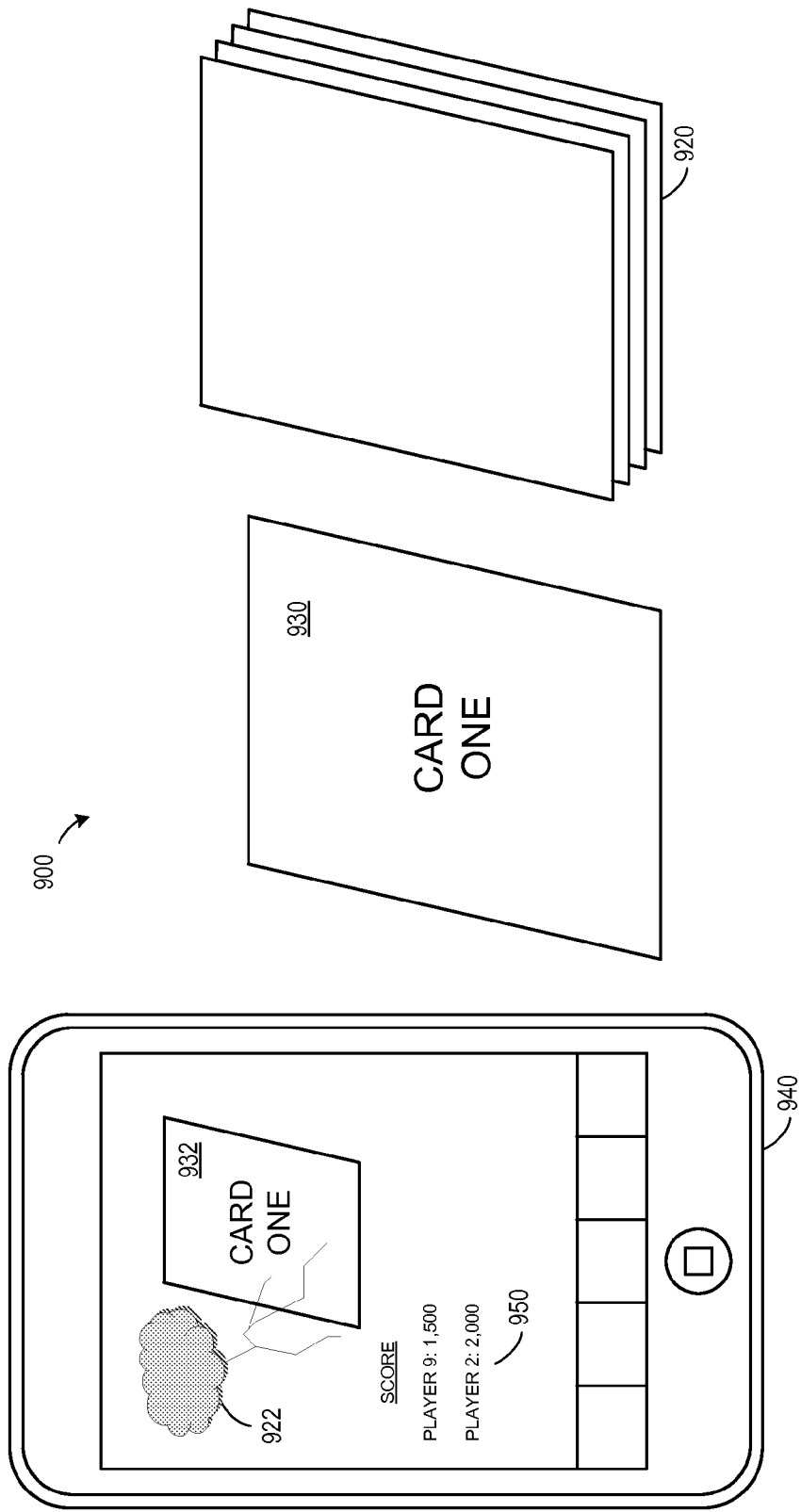
FIG. 9 is an illustration of a game system according to still another embodiment of the present invention.

FIG. 9 is an illustration of a card game system 900 according to still another embodiment of the present invention. In this example, a player may use a deck of face down game cards 920 (e.g., with different cards having different characteristics). The player may take one card 930 from the deck 920, turn it over, and place it face up on a table or a pre-printed card playing field. A portable computing device 940 may recognize the card 930 and display an image of the card 932 along with some augmented information (e.g., a lightning cloud 922 and scoring information 950).

Thus, embodiments of the present invention may provide an enhanced board game experience for players. Moreover, the dynamic and interactive nature of video games may be combined with the social experience provided by board games to provide compelling and family friendly game play.

Note that although specific hardware and data configurations have been described herein, note that any number of other configurations may be provided in accordance with embodiments of the present invention (e.g., some of the information associated with the databases and platforms described herein may be split, combined, and/or handled by external systems).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:
1. A method, comprising:
receiving, at a portable computing device associated with a player, an image from a camera of the portable computing device;
recognizing, by the portable computing device, at least a portion of a board game within the image;
displaying, on a display of the portable computing device, an augmented version of the image associated with the board game;
automatically calculating a numerical board game score for the player based on both (i) an interactive game input received from the player via an input device of the portable computing device and (ii) the image associated with the board game; and
displaying the numerical board game score to the player via the augmented version of the image associated with the board game.
2. The method of claim 1, wherein the portable computing device is associated with at least one of: (i) a hand held computer, (ii) a wireless telephone, (iii) a music player, (iv) a game system, or (iv) a laptop computer.

3. The method of claim 1, wherein the board game is associated with at least one of: (i) a game of chance, (ii) a trivia game, (iii) game tokens, or (iv) a card game.

4. The method of claim 1, wherein the received image comprises a video stream and the displayed augmented version of the image comprises an augmented video stream.

5. The method of claim 1, wherein the augmented version of the image includes at least one of: (i) an animated character associated with the board game, (ii) an effect associated with the board game, or (iii) removing image information associated with the board game.

6. The method of claim 1, wherein the augmented version of the image includes a three dimensional object superimposed on the board game.

7. The method of claim 1, further comprising:
communicating with other portable computing devices, associated with other players, in connection with board game.

8. The method of claim 1, further comprising:
recognizing, by the portable computing device, at least one game token associated with the board game, wherein the augmented image is provided based on the game token.

9. The method of claim 1, wherein the input received from the player via the portable computing device is associated with an interactive game played on the portable computing device.

10. The method of claim 1, wherein the image associated with the board game includes a portion of a visual message not readable by a human and the augmented version of the image includes supplemental information readable by a human when combined with the portion of the visual message.

11. A portable computing device, comprising:
a camera to provide an image;
an augmented reality platform, coupled to the camera, to: (i) receive the image from the camera, (ii) recognize at least a portion of a board game within the image, the image associated with the board game including a portion of a visual textual message not readable by a human, and (iii) generate an augmented version of the image associated with the board game, wherein the augmented version of the image includes supplemental information readable by a human when combined with the portion of the visual textual message not readable by a human; and
a display, coupled to the augmented reality platform, to display the augmented version of the image.

12. The portable computing device of claim 11, wherein portable computing device is associated with at least one of: (i) a hand held computer, (ii) a wireless telephone, (iii) a music player, (iv) a game system, or (iv) a laptop computer.

13. The portable computing device of claim 11, wherein the board game is associated with at least one of: (i) a game of chance, (ii) a trivia game, (iii) game tokens, or (iv) a card game.

14. The portable computing device of claim 11, wherein the received image comprises a video stream and the displayed augmented version of the image comprises an augmented video stream.

15. The portable computing device of claim 11, wherein the augmented version of the image includes at least one of: (i) an animated character associated with the board game, or (ii) a three dimensional object superimposed on the board game.

16. The portable computing device of claim 11, further comprising:
a communication port to communicate with other portable computing devices, associated with other players, in connection with board game.

17. The method of claim 11, wherein the augmented reality platform is further to:
automatically determine a board game score for the player based on an input received from the player and the image;
wherein the input received from the player via the portable computing device is associated with an interactive game played on the portable computing device.

18. A non-transitory, computer-readable medium storing instructions adapted to be executed by a processor to perform a method, the method comprising:
receiving, at a portable computing device associated with a player, an image from a camera of the portable computing device;
recognizing, by the portable computing device, at least a portion of a board game within the image, the image associated with the board game including a portion of a visual textual message not readable by a human; and
displaying, on a display of the portable computing device, an augmented version of the image associated with the board game, wherein the augmented version of the image includes supplemental information readable by a human when combined with the portion of the visual textual message not readable by a human.

19. The medium of claim 18, further storing instructions adapted to be executed by the processor to automatically determine a board game score for the player based on (i) an input received from the player via the portable computing device and (ii) the image associated with the board game.

20. The medium of claim 18, wherein the supplemental information comprises at least one of: (i) supplemental letters, (ii) supplemental words, (iii) supplemental numbers, (iv) supplemental symbols, or (v) supplemental pixels.

21. A method, comprising:
receiving, at a portable computing device associated with a player, an image from a camera of the portable computing device;
recognizing, by the portable computing device, at least a portion of a board game within the image, the image associated with the board game including a portion of a visual textual message not readable by a human; and
displaying, on a display of the portable computing device, an augmented version of the image associated with the board game, wherein the augmented version of the image includes supplemental information readable by a human when combined with the portion of the visual textual message not readable by a human; and
automatically determining a board game score for the player based on (i) an input received from the player via the portable computing device and (ii) the image associated with the board game.

22. The method of claim 21, wherein the supplemental information comprises a portion of a visual textual message that by itself is not readable by a human but is readable by a human when combined with the portion of the visual textual message that is included in the image and not readable by a human.

23. The method of claim 21, wherein the portion of the visual textual message not readable by a human includes a set of letters; and
wherein the supplemental information includes a set of letters that by itself is not readable by a human but is readable by a human when combined with the set of letters of the portion of the visual textual message that is included in the image and not readable by a human.

24. The method of claim 21, wherein the portion of the visual textual message not readable by a human includes a plurality of letters; and
  wherein the supplemental information includes a plurality of letters that by itself is not readable by a human but is readable by a human when combined with the plurality of letters of the portion of the visual textual message that is included in the image and not readable by a human.

* * * * *